Nov. 18, 1958  J. F. BRINSTER ET AL  2,861,202
PULSE SEQUENCE GENERATOR
Filed Jan. 31, 1958  4 Sheets-Sheet 1
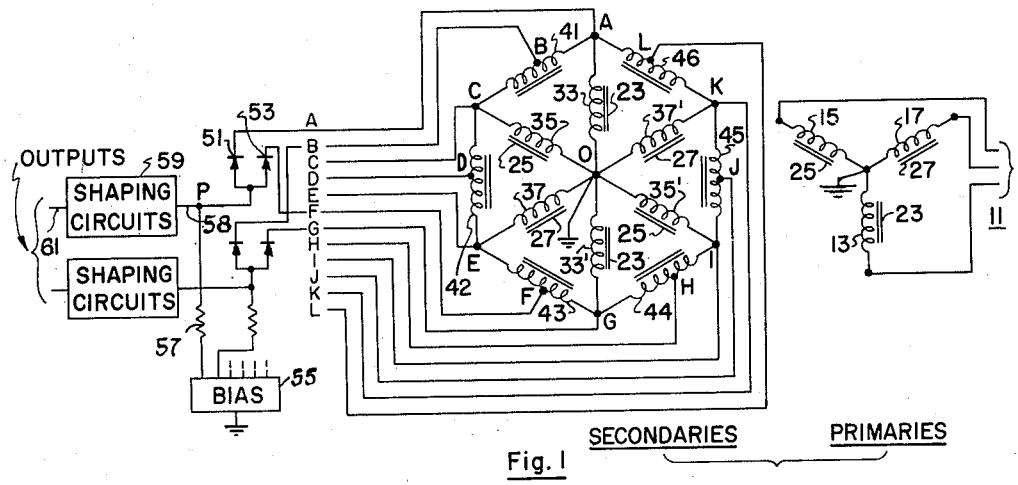
Fig. 1
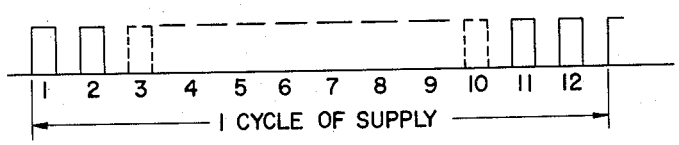
Fig. 4
| PULSE SEQUENCE | 1 | 2 | 3 | 4 | 5 | 6 | 7 | 8 | 9 | 10 | 11 | 12 |
|---|---|---|---|---|---|---|---|---|---|---|---|---|
| PHASE PAIRS | A-F | B-G | C-H | D-I | E-J | F-K | G-L | H-A | I-B | J-C | K-D | L-E |
OUTPUT PULSE SPACING 30 DEGREES
Fig. 5
John F. Brinster  Inventors
Walter C. Johnson
By Ralph K. Bonell  Agent Nov. 18, 1958        J. F. BRINSTER ET AL        2,861,202
PULSE SEQUENCE GENERATOR
Filed Jan. 31, 1958                               4 Sheets-Sheet 2

John F. Brinster
Walter C. Johnson         Inventors

By Ralph K. Bonell  Agent

Nov. 18, 1958 J. F. BRINSTER ET AL 2,861,202
PULSE SEQUENCE GENERATOR
Filed Jan. 31, 1958 4 Sheets-Sheet 3

John F. Brinster
Walter C. Johnson        Inventors

By Ralph K. Bonell   Agent

SECONDARIES          PRIMARIES

SECONDARIES          PRIMARIES

John F. Brinster
Walter C. Johnson          Inventors

By Ralph K. Bonell   Agent

United States Patent Office 2,861,202
Patented Nov. 18, 1958

2,861,202
PULSE SEQUENCE GENERATOR

John F. Brinster and Walter C. Johnson, Princeton, N. J., assignors to General Devices, Inc., Princeton, N. J., a corporation of New Jersey Application January 31, 1958, Serial No. 712,575

13 Claims. (Cl. 307—106)

This invention relates to circuit means for obtaining sequences of electrical pulses and more particularly to means of the foregoing character which receive input power from a polyphase alternating current supply.

The invention has particular utility where similar sequences of pulses are to be repeatedly developed within uniformly spaced like time intervals. An example is the supply of gating pulses to a multi-signal sampling circuit such as is used in telemetry equipment and which may be of the type disclosed in the co-pending joint application for patent of the present inventors entitled "Multi-Signal Sampling Circuit," Serial No. 712,576, filed concurrently herewith.

It is an object of the present invention to provide improved circuit means for generating recurrent sequences of discrete electrical pulses, particularly from the several phases of a polyphase alternating current supply.

It is another object to provide means of the foregoing character which may be assembled in a relatively small space, have a minimum weight, and are inexpensive to manufacture.

Another object is to provide means of the foregoing character in which the time of occurrence, duration, peak amplitude and width of the generated pulses and their relative spacing are readily adjustable.

These and other objects and advantages of the invention will be more clearly apparent upon consideration of the following detailed description of exemplary forms thereof, further illustrated by the accompanying drawings, in which:

Fig. 1 is a circuit diagram showing one embodiment of the invention;

Fig. 4 is a diagram showing a sequence of pulses generated by the circuit of Fig. 1;

Fig. 5 is a table explanatory of certain features of the circuit of Fig. 1;

Figure 3:
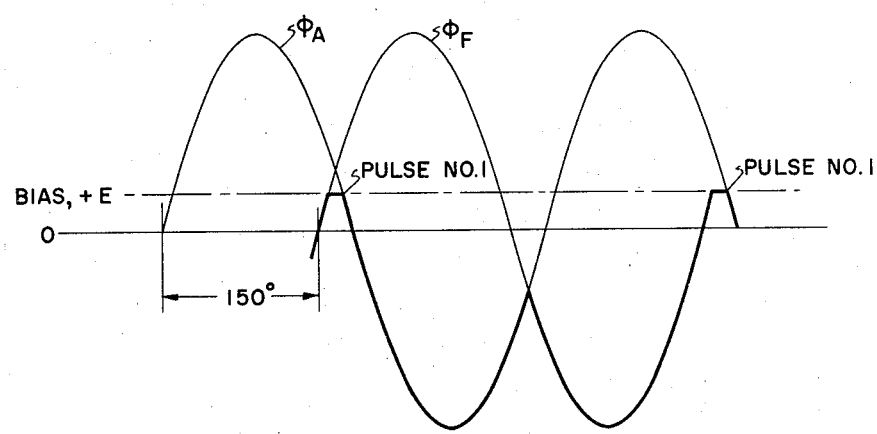
Fig. 3 is a wave diagram illustrative of the operation of the circuit of Fig. 1.

The circuit of Fig. 1 provides means for combining a plurality of sinusoidal voltages of different phases, derived from a polyphase alternating current supply, and for selecting portions of the combined voltage to form a sequence of pulses which appears once during each cycle of the supply voltage. Means providing a sequence of twelve discrete pulses during each cycle of the supply are indicated in this figure for purposes of illustration, each pulse being formed by the combination of two phase-displaced voltages of a three phase source. The invention, however, is not limited as to the number of pulses produced per supply cycle, the number of separate voltages combined to produce a single pulse nor as to the number of phases of the supply.

In Fig. 1 three phase supply 11 is shown connected to the three primary windings, 13, 15 and 17 of a bank of three Y-connected single phase transformers comprising cores 23, 25 and 27, respectively. For convenience in illustrating their interconnection, in the figure the secondary windings of the transformers are shown in a position displaced to the left of the primary windings. The windings wound on a common core may be identified by the reference numeral applied to the core, which is the same wherever the core is shown. Thus, windings 33 and 33' (which may be two sections of a single winding and which will then have relative winding directions so defined) are wound on core 23 together with winding 13 to which they are secondary. Each secondary winding has one terminal connected at point O to ground, that is to a source of a common reference potential.

The six ungrounded secondary winding terminals, respectively designated by the letters A, C, E, G, I and K (the same letters being used in referring to the phases of the potentials at these terminals), are interconnected in pairs by six impedances, shown in Fig. 1 as tapped reactors or auto-transformers having windings 41 to 46, inclusive, of which winding 41, for example, is connected between transformer secondary terminal points A and C. Each of windings 41 to 46 has a tap which defines a phase intermediate the phases of the terminal points which the winding bridges and therefore different from the phase of any of the supply voltages or a 180 degree reversal thereof. For immediate purposes of description this tap will be considered to be a mid-tap. Other arrangements are later described herein. The six points at which taps are made are referenced B, D, F, H, J and L respectively.

Figure 2:
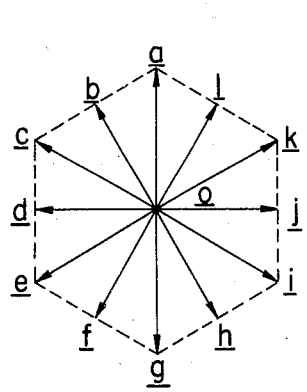
Fig. 2 is a vector diagram of voltages involved in the operation of the circuit of Fig. 1.

In Fig. 2 the relative magnitudes, with respect to the ground connection at point O, and the phases of the potentials at the other lettered points in Fig. 1 are shown in vector form. Thus, the vector o—a represents the potential at point A, o—b that at point B, etc. As seen in this figure twelve voltages equally spaced in phase are available for combination to form pulses. Fig. 5 gives one schedule for the combination of these voltages in pairs to generate a sequence of twelve output pulses. Other schedules may be used. The schedule of Fig. 5 illustrates an often preferred relationship wherein the ratio of the pulse-generating phases to the supply phases is an even integer greater than 2. In Fig. 1 the complete circuit connection for forming two pulses, only, are shown, the connections for forming the other pulses of the sequence being similar. According to Fig. 1, the voltages of phases A and F, for example spaced 150 degrees apart, are respectively applied to terminals of like character of a pair of diode rectifiers 51, 53, polarized as shown, while a bias potential supplied by grounded source 55, by way of resistor 57, is applied in common to the other terminals. Rectifiers 51, 53 preferably are crystal diodes but may be of other type.

The prototype of the generated pulse is the variable potential of the point P which potential is transferred by way of lead 58 to the input of shaping circuits 59. These circuits may be of conventional design to perform whatever pulse-shaping operations are necessary and may be omitted when no modification of pulse form is called for. The output of circuits 59, where used, appears on lead 61. According to the schedule of Fig. 5 the pulse formed by a combination of the voltages of phases A and F is the No. 1 pulse of the sequence, the complete sequence being indicated in Fig. 4. As described in application Serial No. 712,576, this sequence may be caused to appear on a single output lead.

The manner in which phases A and F jointly form the No. 1 pulse of the sequence is illustrated by the diagram of Fig. 3. Considering the potential of point P (Fig. 1) which, as noted, governs the original form of the pulse, this potential tends to follow the lower of the instantaneous potentials of the two generating phases. This is so because the diode, 51 or 53, to which a higher potential is applied is automatically biased to a non-conducting condition by the potential acquired by point P as a result of conduction in the other diode. There is, however, an upper limit to the potential point P can assume which is imposed by the bias applied by source 55. If this were zero, point P could never reach a positive potential, or potential higher than ground, but the application of a positive bias allows the potential of point P to rise to the value of the bias. The varying potential of point P under the circuit conditions of Fig. 1 and with a constant applied bias of +E, is shown as the heavyline wave of Fig. 3, which demonstrates the formation of recurrent pulses of peak amplitude +E.

Figure 8:
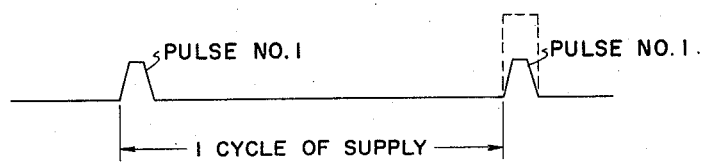
Fig. 8 is a wave diagram illustrative of the operation of the circuit of Fig. 7.
Figure 7:
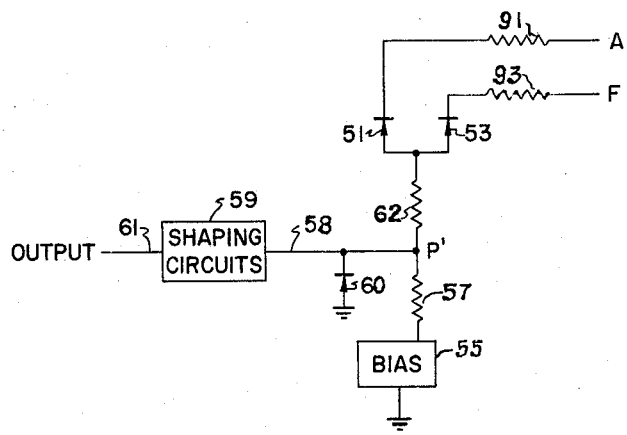
Fig. 7 is a diagram of a modification of a portion of the circuit of Fig. 1.

When it is desired to retain as the generated pulses the positive peaks, only, of the wave of Fig. 3, the negative portions of the wave may be eliminated by unidirectionally clamping a point of the circuit to ground, as point P′ in the bias-applying connection of Fig. 7. Here diode rectifier 60, polarized as shown, in conjunction with resistor 62 provides the clamping action and also serves to keep undesired pulse current out of the output circuit, as further explained in application Serial No. 712,576. When such a clamp is used, the potential of point P′ (and of the output pulses) varies in the manner shown by the full-line wave of Fig. 8. The one pulse shown in dashed-line form indicates a shaped pulse such as may be found at the output of circuits 59. By preventing the building-up of high negative potentials diodes 51, 53 are relieved from having to withstand high reverse potentials.

Diode 53 in phase F and the other diodes defining the leading edges of generated pulses should have a quick recovery time in order to prevent an overshoot or spike at the terminus of the leading edge of a pulse generated by the described circuit while diode 51 in phase A should have a high forward conductivity to minimize rounding of the initial portion of the trailing edge. These possible distortions of the pulses are illustrated in application Serial No. 712,576.

Figure 6:
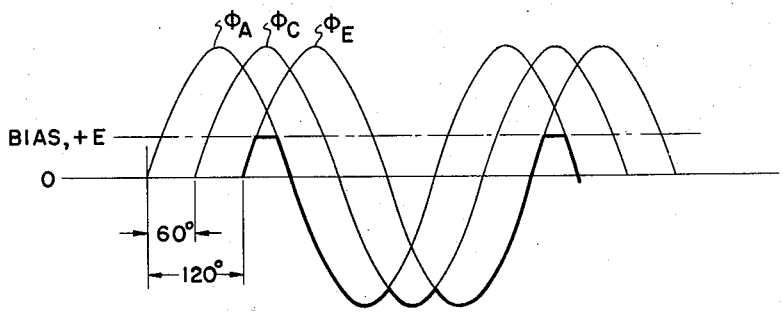
Fig. 6 is a wave diagram for purposes of explanation.

Fig. 6 is an illustration of the formation of output pulses by a combination of more than two, in this case three, phase-displaced voltages. The circuit connections involved are those of Fig. 1 with the exception that the phase rectifiers (corresponding to rectifiers 51, 53) would have like terminals commonly connected in groups of three instead of two for the application of the biasing potential. As in the case of the diagram of Fig. 3 the formation of positive-going pulses is demonstrated in Fig. 6 but it will be apparent that in either case by suitable choices of polarity, where polarity is involved, negative-going pulses may be formed.

Figure 9:
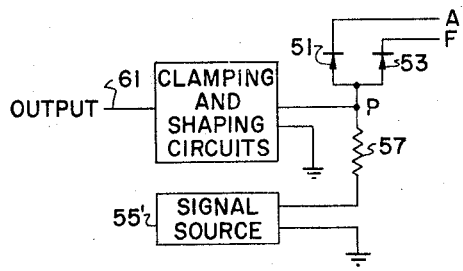
Fig. 9 is a diagram of another modification of the circuit of Fig. 1.
Figure 10:
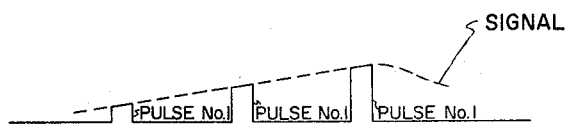
Fig. 10 is a wave diagram illustrative of the operation of the circuit of Fig. 9.

Instead of a bias of constant value furnished by source 55, as referred to hereinbefore, a variable bias may be employed as is assumed to be furnished by source 55′ in the circuit of Fig. 9. Source 55′ is designated as a "Signal source" to bring out the fact that the applied bias in the circuit of the invention may be the instantaneous value of a variable information signal, in which case, since the amplitude of the generated pulses is determined by the bias, these pulses become actual samples of the information signal. Reference in this connection is again made to application Serial No. 712,576, and to present Fig. 10.

Figure 11:
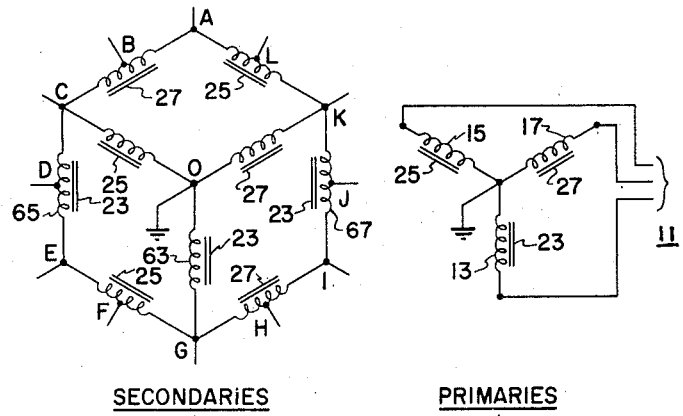
Fig. 11 is a diagram showing a modification of the circuit of a transformer found in Fig. 1.

It will be seen that the circuit arrangement of Fig. 1 requires the use of three insulating transformers comprising cores 23, 25 and 27, respectively, each having a center-tapped secondary winding or an equivalent pair of windings, together with six auto-transformers 41 to 46, incl., a total of nine transformers. An alternative supply transformer arrangement is shown in Fig. 11. This requires the three insulating transformers only, but calls for three secondary windings on each, two of which are tapped. The secondary windings coupled to a particular primary and in which the voltage has a phase corresponding to the phase of the primary voltage may again be identified by the reference numeral applied to the common core. Thus, secondary windings 63, 65 and 67 are wound on core 23, together with primary winding 13. The arrangement of Fig. 11 provides voltages of the same relative magnitudes and phases as those provided by the arrangement of Fig. 1 but may be preferred in certain cases.

Figure 12:
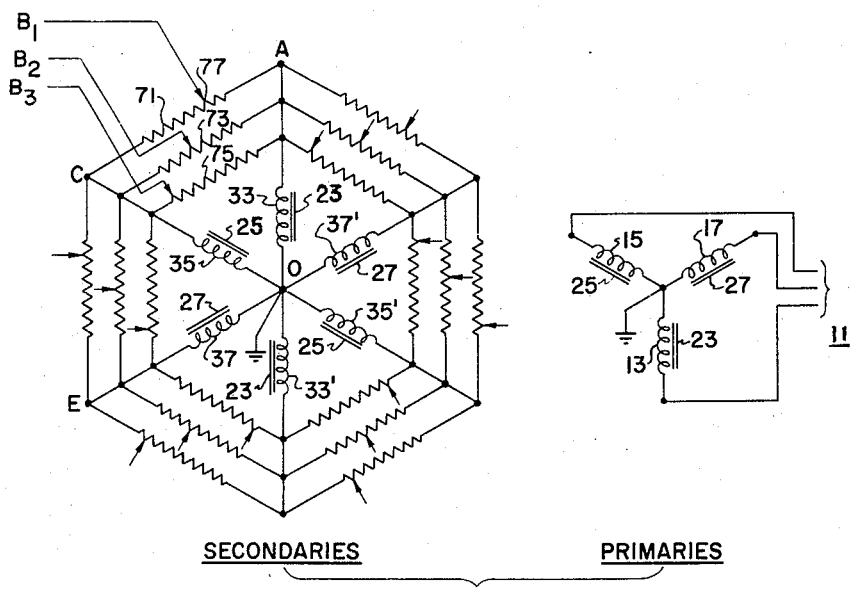
Fig. 12 is a further modification of a portion of the circuit of Fig. 1.

Fig. 12 shows a modification of a portion of the circuit of Fig. 1 wherein instead of auto-transformers bridging the phase points A—C, C—E, etc., resistors are employed. Also, instead of means for deriving a single voltage intermediate in phase between the phases of each of such pairs of points, resistance means are shown for deriving a plurality of intermediate phases the phase position of each of which is independently adjustable. Thus, instead of a single phase B intermediate phases A and C, three independently adjustable phases $B_1$, $B_2$, and $B_3$ are derived in the arrangement of Fig. 12.

The supply transformer arrangement shown in Fig. 12 is that of Fig. 1. Resistors 71, 73 and 75 are bridged in parallel across phase points A and C and each has an adjustable tap, for deriving phases $B_1$, $B_2$ and $B_3$, respectively, and for adjusting the phase positions thereof. It will be appreciated that the same purpose can be served by pairs of discrete series resistors of selected value, instead of an adjustably tapped resistor or potentiometer, across the bridged secondary winding phase points. Similar resistance means are bridged across phase points C and E, etc.

A number of advantages are inherent in means permitting individual phase adjustment. Among these may be mentioned compensation for variations in transformer characteristics and individual adjustment of the position and width of the pulses formed by the combination of the phase-displaced voltages. The latter advantage may be visualized, in particular, by consideration of the pulse-forming waves of Fig. 3.

In the vector diagram of Fig. 2 it can be seen that the voltages are not all of the same magnitude, those intermediate in phase between the phases of the secondary transformer windings being of slightly less magnitude than the others. This is not of significance in the disclosed method of pulse formation by combinations of phase-displaced voltages since it is the value of the applied bias which determines the peak pulse amplitude, this usually being the important pulse characteristic. Because of this fact the circuit of the invention has advantages both in simplicity of design and weight saving over prior art circuits, particularly polyphase voltage derivation circuits which aim to maintain a uniform amplitude for the various phase-displaced sinusoidal voltages supplied thereby.

Figure 13:
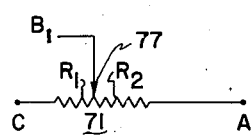
Fig. 13 is a detail of the circuit of Fig. 12.
Figure 14:
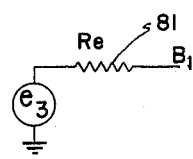
Fig. 14 is a diagram of a circuit equivalent to a portion of the circuit of Fig. 12.

It may be of interest, however, to note in what way the variation in pulse-generating voltage amplitude that can occur in the operation of the circuit of Fig. 12 under various circuit conditions may be determined. Figs. 13 and 14 are referred to in this connection. In Fig. 13 resistor 71, which bridges phase points A and C, is shown as being divided into two sections by an effective tap 77, the respective resistance values of these sections being $R_1$ and $R_2$. The open circuit voltage of phase $B_1$ then is $$e_3 = \left(\frac{R_1}{R_1+R_2}\right)e_1 + \left(\frac{R_2}{R_1+R_2}\right)e_2$$

where $e_1$ and $e_2$ are the instantaneous voltages at phase points A and C, respectively. Since it is the instantaneous values of voltages at these two points which appear in the above equation, the voltage at tap 77 can be determined, both as to magnitude and phase, from the equation.

Fig. 14 is a diagram of an equivalent circuit for derived phase $B_1$. This can be drawn as comprising a generator of constant voltage $e_3$ and a series resistor 81 having a resistance value $R_e$ defined by $$Re = \frac{1}{\frac{1}{R_1} + \frac{1}{R_2}}$$

that is, resistor 81 has the value of the two sections of resistor 71 taken in parallel. This circuit permits the terminal voltage of phase $B_1$ to be determined under load conditions.

The embodiments of the invention shown and described herein are by way of illustration and not of limitation. Equivalent means are to be considered to be within the scope of the invention.

What is claimed is:

1. In circuit means for generating like sequences of electrical pulses in uniformly spaced like time intervals the combination of means for deriving from a polyphase alternating current supply a plurality of alternating potentials having the frequency of the supply and relatively spaced in phase, said potentials being maintained with respect to a common reference potential, a plurality of unidirectional conduction devices each having a pair of terminals of opposite character as determined by conduction in the device, circuit means for applying selected ones of said alternating potentials to terminals of like character of said devices, respectively, the other terminals of said devices being interconnected in groups, a source of bias potential maintained with respect to said reference potential, circuit means for applying said bias potential to each of said groups of interconnected terminals including individual impedance means therein intermediate said bias source and said groups, and pulse output circuit means connected to said last means intermediate said impedance means and said groups of terminals, respectively.

2. The combination defined in claim 1 wherein the number of said alternating potentials is greater than the number of phases of said alternating current supply.

3. The combination defined in claim 1 wherein the number of said alternating potentials is an integral multiple of the number of phases of said alternating current supply greater than two.

4. The combination defined in claim 1 wherein the means for deriving said alternating potentials comprises transformer means having a plurality of windings commonly connected as to one terminal thereof to a source of said reference potential, said windings having induced therein voltages of different phases by said alternating current supply, together with means for deriving potentials differing in phase from the potentials of the other terminals of said windings.

5. The combination defined in claim 1 wherein said bias potential has a constant value and a polarity tending to produce conduction in said unidirectional conduction devices, to supply pulses to said pulse output circuit means having a constant peak amplitude determined by said constant value bias.

6. The combination defined in claim 1 wherein said bias potential has a time-variable value, for example corresponding to the value of a variable information signal, thereby to supply to said pulse output circuit means pulses representative of time-spaced samples of the value of said bias.

7. The combination defined in claim 1 which further includes means for unidirectionally clamping a selected point of each of said bias-applying circuit means to a source of constant potential.

8. The combination defined in claim 7 wherein said constant potential is said reference potential.

9. In circuit means for generating like sequences of electrical pulses in uniformly spaced like time intervals by combining portions of a plurality of phase-displaced voltage waves derived from a polyphase alternating current supply the combination of transformer means comprising coupled primary and secondary windings connected in each phase of the supply, said secondary windings each having one point thereon connected to a point at a common reference potential, impedance means connecting in pairs other points respectively on different ones of said secondary windings, the impedance means connecting each such pair of points having an effective tap intermediate the connected points for deriving an alternating potential differing in phase from that of either of said connected points, said tap being adjustable as to position along said impedance means to adjust the phase of the alternating potential thereat, a plurality of unidirectional conduction devices each having a pair of terminals of opposite character as determined by conduction in the device, circuit means connecting points selected from the combination including points on said secondary windings and said impedance means taps to terminals of like character of said unidirectional conduction devices, respectively, a source of bias potential maintained with respect to said reference potential, circuit means for applying said bias potential to groups of terminals of the other character of said unidirectional conduction devices including impedance means intermediate said source and each of said groups, and pulse output circuit means connected to said last means intermediate said last mentioned impedance means and said groups of terminals, respectively.

10. The combination defined in claim 9 wherein each of said impedance means connecting points on secondary windings of said transformer means comprises resistance means the resistance value of which is effectively divided into a plurality of portions to define said taps thereon.

11. The combination defined in claim 9 wherein each of said impedance means connecting points on secondary windings of said transformer means comprises a plurality of parallel-connected resistors, each of said resistors having at least one tap intermediate the terminals thereof, the positions of said taps being adjustable to determine the phase of the alternating potential thereat.

12. In circuit means for generating like sequences of electrical pulses in uniformly spaced like time intervals the combination of means for deriving from a polyphase alternating current supply a plurality of alternating voltages at the frequency of the supply and relatively spaced in phase, at least one of said voltages having a phase differing from any phase of the supply or a 180 degree reversal thereof, individual circuit means receiving said voltages each comprising a rectifier, means connecting terminals of like character of said rectifiers in pairs, a source of bias potential, individual circuit means each including an impedance connecting said source and said pairs of terminals, and an output circuit connected to said last means intermediate each of said impedances and the pair of connected rectifier terminals associated therewith.

13. The combination defined in claim 12 wherein said means for deriving a plurality of alternating voltages comprises a plurality of Y-connected, grounded neutral secondary windings of transformer means having the primary windings thereof connected to said polyphase alternating current supply, and a plurality of groups of parallel-connected resistors having effectively adjustable individual taps thereon, each group bridged across a pair of ungrounded terminals of said windings for selecting a potential having a phase intermediate the phases of the terminals bridged thereby.

No references cited.